US 7,402,617 B2

(12) United States Patent
Ganapathiappan et al.

(10) Patent No.: US 7,402,617 B2
(45) Date of Patent: Jul. 22, 2008

(54) LOW BULK DENSITY, LOW SURFACE DIELECTRIC CONSTANT LATEX POLYMERS FOR INK-JET INK APPLICATIONS

(75) Inventors: Sivapackia Ganapathiappan, Los Altos, CA (US); Kent Vincent, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 10/360,473

(22) Filed: Feb. 6, 2003

(65) Prior Publication Data

US 2004/0157957 A1    Aug. 12, 2004

(51) Int. Cl.
*C08K 9/10* (2006.01)
*C09D 11/10* (2006.01)
*C08K 9/00* (2006.01)
*C09D 11/00* (2006.01)

(52) U.S. Cl. .................. 523/205; 523/160; 523/161; 523/200; 524/556; 524/560; 524/577

(58) Field of Classification Search .............. 523/160, 523/161, 200, 201, 205; 524/556, 560, 577
See application file for complete search history.

(56) References Cited

U.S. PATENT DOCUMENTS

| 3,615,469 | A | * | 10/1971 | Ramp | 430/18 |
|---|---|---|---|---|---|
| 4,078,493 | A | * | 3/1978 | Miyamoto | 101/450.1 |
| 4,665,107 | A | * | 5/1987 | Micale | 523/105 |
| 5,786,420 | A | | 7/1998 | Grandhee | |
| 5,814,685 | A | * | 9/1998 | Satake et al. | 523/201 |
| 5,954,866 | A | * | 9/1999 | Ohta et al. | 106/31.89 |
| 5,977,210 | A | * | 11/1999 | Patel et al. | 523/161 |
| 5,990,202 | A | | 11/1999 | Nguyen et al. | |
| 6,057,384 | A | | 5/2000 | Nguyen et al. | |
| 6,239,193 | B1 | * | 5/2001 | Cheng et al. | 523/160 |
| 6,248,805 | B1 | | 6/2001 | Nguyen et al. | |
| 6,277,437 | B1 | | 8/2001 | Helmer et al. | |
| 6,417,249 | B1 | | 7/2002 | Nguyen et al. | |
| 6,485,874 | B1 | * | 11/2002 | Moffat et al. | 430/108.22 |
| 6,613,814 | B2 | * | 9/2003 | Ishizuka et al. | 523/160 |
| 6,794,425 | B1 | * | 9/2004 | Ellis et al. | 523/160 |
| 2002/0025994 | A1 | | 2/2002 | Ishizuka et al. | |
| 2004/0063808 | A1 | * | 4/2004 | Ma et al. | 523/160 |
| 2004/0066440 | A1 | * | 4/2004 | Ungefug et al. | 347/101 |
| 2004/0112525 | A1 | * | 6/2004 | Pereira et al. | 156/292 |
| 2004/0116596 | A1 | * | 6/2004 | Vincent et al. | 524/775 |
| 2004/0131855 | A1 | * | 7/2004 | Ganapathiappan | 428/407 |

FOREIGN PATENT DOCUMENTS

| EP | 1 245 652 | 10/2002 |
|---|---|---|
| EP | 1 300 422 | 4/2003 |

OTHER PUBLICATIONS

Brandup, J., Immergut, E.H., and Grulke, E.A.; Polymer Handbook 4th Ed., John Wiley& Sons, New York, 1999 (pp. III/8-III/1 and III/34-III/35).*
Brandup, J., Immergut, E.H., and Grulke, E.A.; Polymer Handbook 4th Edition, John Wiley & Sons, New York, 1999 (p. III/28).*
Bicerano, Jozef, "Prediction of Polymer Properties," 1996, pp. 244-249.

* cited by examiner

*Primary Examiner*—Sanza L McClendon

(57) ABSTRACT

The present invention is drawn toward latex particulates in ink-jet inks having a surface dielectric constant from 2.0 to 3.0.

47 Claims, No Drawings

LOW BULK DENSITY, LOW SURFACE DIELECTRIC CONSTANT LATEX POLYMERS FOR INK-JET INK APPLICATIONS

FIELD OF THE INVENTION

The present invention relates generally to ink-jet printing with latex-containing inks. Additionally, the present invention relates to low density and/or low dielectric constant latexes and latex-based inks for ink-jet ink applications.

BACKGROUND OF THE INVENTION

Though there has been great improvement in ink-jet printing technology, there is still improvement that can be made in many areas. With respect to ink-jet ink chemistry, the majority of commercial ink-jet inks are water-based. Thus, their constituents are generally water-soluble, as is the case with many dyes, or water dispersible, as is the case with pigments. Furthermore, ink-jet inks have low viscosity (typically 5 cps or less) to accommodate high frequency jetting and firing chamber refill processes common to ink-jet pens.

In addition to the typical color and general image fade issues that occur in many ink-jet ink systems, ink-jet prints have also been known for poor durability when exposed to water or high humidity. This results from the use of water-soluble and water dispersible colorants within the water-based ink. There has been great improvement in the area of water durability of ink-jet inks through incorporation of certain ink-jet compatible latex polymers. The latex can consist of small micron or submicron hydrophobic polymeric particles of high molecular weight that are dispersed in the aqueous ink-jet ink. When printed as part of an ink-jet ink, a latex component of the ink can form a film on a media surface, entrapping and protecting the colorant within the hydrophobic print film. However, such latex compositions can create problems with respect to pen reliability, as well as with respect to settling of the latex over time.

Polymers that form durable films are typically made from copolymers having bulk densities on the order of 1.15 g/cm$^3$ or greater, which is appreciably greater than water, the primary component of thermal ink-jet ink. As such, conventional latex particles are normally designed to flocculate so that latex precipitate may be easily shaken or stirred back into dispersion without agglomeration. Such flocculation behavior is well known with latex paints. Unfortunately, these conventional teachings do not address the unique needs of ink-jet printing applications. For example, the micro-channel ink feeds in ink-jet pens are easily clogged with precipitant, particularly when a pen is stored or otherwise unused for prolonged periods of time. Such precipitation is not easily redispersed by pen shaking, as flow constriction prohibits adequate mixing within micro-channels of pen architecture. Additionally, micro-channels used for jetting can house some of the ink over prolonged periods in preparation for firing, and settled latex can cause further constricting of the micro-channels. This can result in ink-jet pen failure due to clogging of the micro-channels. Further, the micron-order settling distances found in the fluid channels of thermal inkjet pens exacerbate the problem.

SUMMARY OF THE INVENTION

It has been recognized that it would be advantageous to develop latex particulates that are highly functional for use with ink-jet inks, and which remain suspended over long periods of time, if not indefinitely. In one embodiment, a latex particulate is provided having a bulk density from 0.90 g/cm$^3$ to 1.10 g/cm$^3$ and a surface dielectric constant from 2.0 to 3.0. These latexes can be used in ink-jet inks, or with other predominantly water based compositions.

In more detail, an ink-jet ink is provided that can comprise effective amounts of an ink vehicle; a colorant admixed in the ink vehicle; latex particulates dispersed in the ink vehicle; and surfactant adsorbed on the surface of the latex particulates. The latex particulates can have a bulk density from 0.90 g/cm$^3$ to 1.10 g/cm$^3$ and/or a surface dielectric constant from 2.0 to 3.0.

In another embodiment, an ink-jet ink can comprise effective amounts of an ink vehicle; a colorant admixed in the ink vehicle; and latex particulates dispersed in the ink vehicle, wherein the latex particulates have a surface dielectric constant from 2.0 to 3.0.

In still another embodiment, an ink-jet ink is also provided comprising effective amounts of an ink vehicle having a liquid density; a colorant admixed in the ink vehicle; and latex particulates dispersed in the ink vehicle, wherein the latex particulates have a bulk density from 0.1 g/cm$^3$ less than the liquid density to 0.1 g/cm$^3$ greater than the liquid density.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context dearly dictates otherwise.

As used herein, "liquid vehicle" or "ink vehicle" refers to the fluid in which colorants and latex particulates or colloids are dispersed to form ink-jet inks in accordance with the present invention. Many liquid vehicles and vehicle components are known in the art. Typical ink vehicles can include a mixture of a variety of different agents, such as surfactants, co-solvents, buffers, biocides, sequestering agents, viscosity modifiers, and water.

"Colorant" can include dyes, pigments, and/or other particulates that may be suspended in an ink vehicle with latex prepared in accordance with embodiments of the present invention. Dyes are typically water soluble, and therefore, can be desirable for use in many embodiments. However, pigments can also be used in other embodiments. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle. With respect to the other particulates that can be used, examples include magnetic particles, aluminas, silicas, and/or other ceramics or organo-metallics, whether or not such particulates impart color.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

As used herein, "effective amount" refers to at least the minimal amount of a substance or agent, which is sufficient to achieve a desire effect. For example, an effective amount of an "ink vehicle" is at least the minimum amount required in order to create an ink composition, while maintaining properties necessary for effective ink-jetting.

The term "freqcel" denotes a reduction in ink drop ejection velocity with increased pen firing frequency. The lowering of drop velocity can be a problem as changes in the trajectory of the fired drops can reduce drop placement accuracy on the print media. Without being bound by one particular theory, freqcel may be attributable to thermal shear stripping of surfactant from latex particles near a pen firing chamber at the time of drop nucleation. As surfactant is typically present in inkjet inks to help separate particles, a reduction in surface-adsorbed or surface-attracted surfactant can promote greater inter-particle attraction. This can result in increased ink viscosity. Greater pen firing energy can be used to counteract this phenomenon, but bubble entrapment can be exacerbated at these higher viscosities, which is known to worsen freqcel performance.

The term "decel" denotes an increase in ink flow resistance within pen micro-channels, which in turn, reduces ejected drop volume. Such flow resistance can be caused by changes in ink rheology or plugged channels, and is often responsible for ink starvation within a pen firing chamber.

The term "decap" is a measure of how long a nozzle may remain inactive before plugging and how many pen firings are required to re-establish proper drop ejection.

The terms "surface dielectric constant" and "bulk dielectric constant" as well as the terms "bulk density" and "glass transition temperature" are interrelated and require a detailed explanation. Table 1 below provides, by way of example, certain homopolymer values for homopolymers that can be used to predict bulk or surface dielectric constants, bulk densities, and glass transition temperatures of latex copolymeric particulates prepared in accordance with principles of the present invention. Such predictions can be made in accordance with accepted Bicerano correlations, as described in *Predictions of Polymer Properties*, Bicerano, Jozef, Marcel Dekker, Inc., New York, N.Y., 1996. Table 1 should not be construed as including all homopolymers that can be used to make the latex particulates in accordance with principles of the present invention. Additionally, not all of the homopolymers listed in Table 1 are effective for use in making the latex particulates in accordance with principles of the present invention Table 1 is merely provided to teach what is meant by the terms "surface dielectric constant" or "bulk dielectric constant" as well as the terms "bulk density" and "glass transition temperature."

TABLE 1

| | Homopolymer values | | | | | | | |
|---|---|---|---|---|---|---|---|---|
| Monomer | W | $E_{coh1}$ | $V_w$ | $N_{dc}$ | $\epsilon$ | V | $\rho$ | $T_g$ |
| n-octyl methacrylate | 198.31 | 69686 | 127.08 | 24 | 2.45 | 204.2 | 0.971 | −20 |
| Styrene | 104.15 | 39197 | 64.04 | 10 | 2.55 | 99.1 | 1.050 | 99.9 |
| cyclohexyl methacrylate | 168.24 | 59978 | 99.86 | 24 | 2.58 | 153.2 | 1.098 | 103.9 |
| 2-ethylbutyl methacrylate | — | 59130 | 107.28 | 24 | 2.68 | 163.7 | 1.040 | 11 |
| hexyl methacrylate | 170.23 | 59804 | 106.70 | 24 | 2.69 | 168.5 | 1.010 | −5.2 |
| isobutyl methacrylate | 142.20 | 48496 | 85.60 | 224 | 2.70 | 136.1 | 1.045 | 47.9 |
| t-butyl methacrylate | 142.20 | 46427 | 84.94 | 24 | 2.73 | 139.4 | 1.020 | 107 |
| sec-butyl methacrylate | 142.20 | 48872 | 86.92 | 24 | 2.75 | 135.2 | 1.052 | 57 |
| 2-ethylhexyl methacrylate | 198.31 | 77980 | 127.65 | 24 | 2.75 | 202.2 | 1.020 | 5.2 |
| n-butyl methacrylate | 142.20 | 49921 | 86.33 | 24 | 2.77 | 134.8 | 1.055 | 20 |
| n-butyl acrylate | 128.17 | 46502 | 76.82 | 24 | 2.87 | — | — | −54 |
| benzyl methacrylate | 176.22 | 64919 | 98.40 | 24 | 2.90 | 149.4 | 1.179 | — |
| hexyl acrylate | 156.23 | 65352 | 98.56 | 24 | 2.91 | 151.6 | 1.030 | −57.2 |
| ethyl methacrylate | 114.15 | 40039 | 65.96 | 24 | 3.00 | 102.0 | 1.119 | 50.9 |

TABLE 1-continued

Homopolymer values

| Monomer | W | $E_{coh1}$ | $V_w$ | $N_{dc}$ | $\epsilon$ | V | $\rho$ | $T_g$ |
|---|---|---|---|---|---|---|---|---|
| methyl methacrylate | 100.12 | 35097 | 54.27 | 24 | 3.10 | 85.6 | 1.170 | 104.9 |
| methyl acrylate | 86.09 | 31678 | 44.76 | 24 | 3.28 | 70.6 | 1.220 | 8 |
| ethylene glycol di methacrylate | 198.22 | 88978 | 111.69 | 48 | 3.35 | 169.88 | 1.169 | — |
| methacrylic acid | 86.09 | 38748 | 45.99 | 24 | 3.52 | 70.6 | 1.219 | 187 |
| hydroxyethyl methacrylate | 130.14 | 66502 | 69.44 | 36 | 3.74 | — | — | 86 |
| methacryloyl-oxyethyl succinate | 230.22 | 111243 | 116.06 | 72 | 3.84 | 177.4 | 1.298 | 58.3 |
| acrylic acid | 72.06 | 35329 | 36.48 | 24 | 3.90 | 53.5 | 1.347 | 106 |

In Table 1 above, the abbreviations used are defined as follows:
W Monomer molecular weight (grams/mole)
$E_{coh1}$ Cohesive energy (joules/mole)
$V_w$ Van der Waals volume (cm$^3$/mole)
$N_{dc}$ Fitting parameter (cm$^3$/mole)
$\epsilon$ Dielectric constant (no units)
V Molar volume (cm$^3$/mole)
$\rho$ Density (grams/cm$^3$)
$T_g$ Glass transition temperature (Celsius)

From these values, the bulk or surface dielectric constant, bulk density, and glass transition temperature of latex copolymers formed by copolymerization of any combination of these monomers (or other known monomers where these values are available) may be predicted.

With respect to latex particulates that are polymerized or copolymerized to be roughly uniform throughout, the terms "bulk dielectric constant" and "surface dielectric constant" can be used interchangeably. For example, the bulk dielectric constant describes not only the core hydrophobicity, but also the surface hydrophobicity, as the core and the surface are, on average, of the same material. However, in embodiments where a core-shell, inverse core-shell, or composite latex is formed, the bulk dielectric constant will usually be different than the surface dielectric constant, as the core of the latex will be of a different polymer or copolymer than the shell. Thus, in core-shell, inverse core-shell, and composite embodiments, it is primarily the dielectric constant of the shell material, i.e., the surface dielectric constant, which plays a role in surfactant adsorption. As a result, when referring to dielectric constant values, surface dielectric constant values will be used, as the surface dielectric constant values account for both single material latex copolymer particulates as well as core-shell, inverse core-shell, and composite latex copolymer particulates.

With these definitions in mind, the present invention can include a latex particulate having a bulk density from 0.90 g/cm$^3$ to 1.10 g/cm$^3$ and a surface dielectric constant from 2.0 to 3.0. These latexes can be used in ink-jet inks, or with other predominantly water based compositions.

An ink-jet ink is also provided that can comprise effective amounts of an ink vehicle; a colorant admixed in the ink vehicle; latex particulates dispersed in the ink vehicle; and surfactant adsorbed on the surface of the latex particulates. The latex particulates can have a bulk density from 0.90 g/cm$^3$ to 1.10 g/cm$^3$ and/or a surface dielectric constant from 2.0 to 3.0.

Another ink-jet ink that can be formulated in accordance with embodiments of the present invention can comprise effective amounts of an ink vehicle; a colorant admixed in the ink vehicle; and latex particulates dispersed in the ink vehicle, wherein the latex particulates have a surface dielectric constant from 2.0 to 3.0.

In yet another embodiment, another ink-jet ink can comprise effective amounts of an ink vehicle having a liquid density; a colorant admixed in the ink vehicle; and latex particulates dispersed in the ink vehicle, wherein the latex particulates have a bulk density from 0.1 g/cm$^3$ less than the liquid density to 0.1 g/cm$^3$ greater than the liquid density.

There are multiple aspects of the present invention that can be used together, or separately, in order to achieve a desired result. An example of such a desired result includes the ability to incorporate latex particulates in a predominantly water-based ink vehicle with little or no settling over a period of years.

In accordance with embodiments of the present invention, low density polymers can primarily comprise hydrocarbon chains and rings that tend to be more hydrophobic, and have a lower dielectric constant. Thus, three features of the invention include physical properties related to density, hydrophobicity, and dielectric constant. Generally, more polar monomers include a higher volume concentration of heavier atoms, such as nitrogen and oxygen, giving to higher bulk densities. Such polar polymers tend to be more hydrophilic, and thereby less attractive to the hydrophobic segments of surfactants, if a surfactant is to be associated with a latex particulate. Further, more hydrophilic surfaces absorb water molecules that may disrupt optimal absorption of surfactants on the latex surface.

With specific reference to surface dielectric constant, the surface of the latex particulates prepared in accordance with embodiments of the present invention can have a room temperature surface dielectric constant from 2.0 to 3.0. In another embodiment, the surface dielectric constant can be from 2.3 to 2.8. A surface dielectric constant of from 2.0 to 3.0 generally provides a sufficient degree of surface hydrophobicity to protect against surfactant stripping under the high shear conditions that occur during drop ejection. A latex surface dielectric constant as low as 2.0 can be achieved by incorporating monomers having a very low dielectric constant. Examples of such monomers include fluorosilicons or fluorocarbons.

Dielectric constant values can be used as a measure of hydrophobicity. The hydrophobic segments of conventional surfactants typically comprise long branched or unbranched hydrocarbon chains, e.g., from 5 to 50 atoms in length, at a first end, and branched or unbranched long hydrophilic chains, e.g., from 5 to 100 atoms in length, at the other end. An example of such an unbranched surfactant is shown as Formula 4 below:

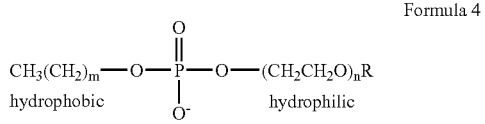

Formula 4 wherein m can be from 5 to 50, n can be from 5 to 100, and R can be H or $CH_3$. Formula 4 merely provides one exemplary surfactant that can be used. Other known surfactants can also be used. As shown, the hydrophobic moiety and the hydrophilic moiety can be bound together by an acid, such as a phosphoric acid. Such an acid can add charge to the surface of the latex, which compliments the charge that may already be present on the surface. Further, the hydrophilic moiety adds steric stabilization to the surface of the latex.

Hydrophobic moieties of the surfactant, if primarily aliphatic, typically are expected to have dielectric constants of about 2.3, as is nominal for polyolefins. Good adhesion of a hydrophobic moiety of a surfactant to the surface of a latex particulate can occur when the dielectric constants of the two are matched as close as can be achieved. Departure from optimal adhesion is believed to be proportional to the dielectric constant difference between a hydrophobic moiety of the surfactant and the surface of a latex particulate. As a result, it has been recognized that a narrow range of latex surface dielectric constants, as well as bulk densities, can be obtained by engineering latexes to meet these criterion. By obtaining one or both of these properties, if a surfactant is desired to be adsorbed on the surface of the latex particulates, adequate surfactant adhesion can be obtained to minimize or eliminate latex printability and dispersion related problems often associated with latex-containing ink-jet inks. Further, such formulations can prevent both latex floatation and setting within an aqueous-based ink vehicle. In other words, upon adhesion of the hydrophobic moiety of the surfactant to the surface of a latex particulate, the hydrophilic moiety can extend from the surface in a hair-like manner, providing properties to the hydrophobic latex particulate that makes it useable in a predominantly water-based ink-jet ink vehicle.

With respect to bulk density, as described, an ink-jet compatible latex polymer in accordance with embodiments of the present invention can have a bulk density ($\rho$) from 0.90 g/cm$^3$ to 1.10 g/cm$^3$. In another embodiment the bulk density can be from 1.02 g/cm$^3$ to 1.05 g/cm$^3$. This property can protect against latex particle settling independent of latex surface or dispersion chemistry.

The latex particulate and ink-jet ink formulations described herein, in part, result from the discovery that latex particles, e.g., of 200 nm to 300 nm in size, having bulk densities greater than 1.10 g/cm$^3$ tend to settle out of or significantly layer in dilute (0.25 wt % solids) aqueous test tube solutions within three months. Latex particles of lower density do not show visible precipitate or layering within several years in the same tests. Conversely, if the bulk density of a given latex particulate in water is too low, the latex particulate can float to the top of an aqueous solution. These thresholds can be explained by Brownian liquid-to-particle momentum exchange that maintains particles in suspension within limits related to particle and fluid densities, particle size, and temperature.

In a more detailed embodiment, the bulk density range provided can be modulated such that the bulk density is above the liquid component density of the predominantly water-based ink vehicle. This can prevent latex floatation, and within a relatively narrow density band above this level, Brownian energy can prevent setting. As ink vehicle fluid densities of predominantly water-based ink-jet inks are typically about 1.02 g/cm$^3$, bulk densities of latex particulates that are approximately the same to slightly higher can be included with little to no settling over a period of years. Thus, in this embodiment, in order to prevent latex setting, latex density can be kept in a range at or above the density of an ink vehicle and within the range that Brownian momentum exchange is effective. The rate of setting increases with the difference between the vehicle and latex densities.

One strategy that can be used to obtain appropriate bulk density is to utilize low density latex polymers having at least one ring containing monomer. The ring containing monomer improves the print film durability of the latex. In one embodiment, the latex according to this aspect of the invention can contain a blend of alkane, e.g., hexyl methacrylate, and ring-based, e.g., styrene, monomers to adjust the thermal glass transition temperature for print film formation at a given temperature. The use of these or other similar polymers can provide the above-mentioned benefits without a reduction in print film durability. The glass transition temperature of the polymer can fall in the range of about 0° C.$<T_g<$50° C. In an alternative embodiment, the glass transition temperature range can be 10° C.$<T_g<$40° C. These temperature ranges can allow for room temperature film formation of an ink without process or pen induced particle agglomeration. Higher glass transition temperature ranges may be selected for use when latex coagulation is accomplished at a higher than ambient temperature, for example by heated fuser roller. When using a conjugated ring structure, the π-electrons of such ring structures can provide strong adhesive forces without the added density typical of more polar monomers. Additionally, a blend of alkane and ring-based monomers can be used to adjust the thermal glass transition temperature ($T_g$) of the latex copolymer for print film formation.

The latex particulates of the present invention can be prepared through conventional free radical addition of a monomer mixture through emulsion polymerization. Suitable monomers are included in U.S. Pat. No. 6,057,384, which is incorporated herein by reference. The latex can be dispersion stabilized through incorporation of a monomer or monomers that promote latex surface charge. Such monomers are represented by acrylic acid, methacrylic acid, vinyl benzoic acid, and methacryloyloxyethylsuccinate. These charge forming monomers typically comprise from 0.5 wt % to 20 wt % of the latex particulate (or the surface of the latex particulate if a core-shell latex). In a more detailed embodiment, the charge forming monomers can be present at from 3 wt % to 10 wt % of the monomer mix. These charge forming monomers can be neutralized after latex polymerization to form salts. Such salts may be formed through the reaction of a monomer carboxylic acid with potassium hydroxide. Other known neutralization compositions can also be used, as is known in the art.

The latexes prepared in accordance with the principles disclosed herein can be thermal shear stabilized for use in thermal inkjet printers. Such stabilization can be obtained through incorporation of from 0.5 wt % to 5 wt % addition of a multimer or crosslinking agent, such as a dimer, capable of forming crosslinks between polymer chains in the latex. In another embodiment, the multimer can be present at from 1 wt % to 2 wt %. Such a multimer can be represented by ethylene glycol dimethacrylate, though others can be used as would be known by those skilled in the art after considering the present disclosure. This narrow range of crosslinking has been found preferred in maintaining the integrity of the latex under the high thermal shear conditions of thermal ink-jetting, while not adversely impacting its room temperature film-forming properties.

In an alternate form, a conventional core-shell latex structure may also be prepared in accordance with principles of the present invention, wherein the shell layer incorporates a monomer mix in accordance with the properties described herein, e.g., surface charge monomer, multimer, dielectric constant specifications, etc. The shell layer, in this case, can provide thermal shear and dispersion stabilizing properties independent of the properties of the latex core. Additionally, the core and shell polymers collectively can be configured to produce a latex particle having a bulk density and glass transition temperature as defined previously with respect to non-composite polymeric or copolymeric latexes. As is known in the art, core-shell latexes can be prepared in a two-step process, where a first latex particle is synthesized and forms a seed for polymerization of shell monomers around the seed particle.

Whether using single material latex particulates or core-shell latex particulates, as long as they are prepared in accordance with the principles described herein, problems associated with freqcel, decap, and decel can be substantially improved. For example, freqcel can be proportionately overcome by increased latex surface hydrophobicity. A latex principally comprised of a methyl methacrylate-hexyl acrylate copolymer, for example, shows freqcel at 3 kHz, while a significantly more hydrophobic styrene-hexyl methacrylate copolymer latex shows virtually no freqcel through 12 kHz. More hydrophobic latex, however, when stripped of its surfactant through dialysis, shows significant freqcel at 3 kHz, as observed with the less hydrophobic latex. Without being bound by any particular theory, the adhesion between the hydrophobic segment of the surfactant and the latex surface seems to improve as the dielectric constants are more closely matched, thus making the surfactant less likely to strip off during jetting from a thermal ink-jet pen.

Further, both decel and decap are also influenced by the attractive forces that exist between latex particles and the extent of surfactant adhesion. Latex particles that are more hydrophobic have a lower bulk dielectric constant and, thereby, lower van der Waals attraction energy. Likewise, surfactants attached to a more hydrophobic particle surface are less likely to be dislodged as particles approach each other or ink-jet pen surfaces. As a latex surface having well distributed surfactant coverage is more likely to stay hydrated and separated from other surfaces, better latex performance can be achieved.

A typical ink vehicle formulation that can be used with the latexes described herein can include water, and optionally, one or more co-solvents present in total at from 0 wt % to 30 wt %, depending on the pen architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the ink vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the ink vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

With respect to the colorant, an effective amount of either pigment and/or dye can be used. In one embodiment, the colorant can be present at from 0.5 wt % to 10.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Various Latexes

Nine latex copolymers were prepared using the same procedure and total weight percents of monomers and additives, the only difference being the individual monomers and weight percent for each monomer selected. The monomer content for each copolymer is set forth in Table 2 below:

TABLE 2

Monomer content for each of nine copolymers prepared

| Copolymer | Monomers (wt %) | | | | | | | | |
|---|---|---|---|---|---|---|---|---|---|
| | MMA | Styrene | BMA | HMA | EHMA | HA | MES | MAA | EGDMA |
| 1 | 74 | | | | | 15 | 10 | | 1 |
| 2 | 58 | | | | | 31 | 10 | | 1 |
| 3 | 48 | | | | | 41 | 10 | | 1 |
| 4 | 41 | | | | | 48 | 10 | | 1 |
| 5 | | | 40 | | 49 | | 10 | | 1 |
| 6 | | | 20 | 69 | | | 10 | | 1 |
| 7 | | | | 89 | | | 10 | | 1 |
| 8 | | 20 | | 59 | | | 10 | | 1 |
| 9 | | 20 | | 73 | | | | 6 | 1 |

In Table 1 above, the abbreviations are defined as follows:
MMA methyl methacrylate
BMA butyl methacrylate
HMA hexyl methacrylate
EHMA 2-ethylhexyl methacrylate
HA hexyl acrylate
MES methacrylolyoxy ethyl succinate
MAA methacrylic acid
EGDMA ethylene glycol dimethacrylate The procedure used to prepare each individual latex was as follows. A 200 gram monomer mix consisting of three or four monomers according to Table 2 was mixed into 70 ml of water. Each mixture was emulsified with Rhodafac RS710 surfactant in 14.6 g of water (14.6 g). The Rhodafac concentration for each copolymer preparation was varied from between 1.5 wt % to 2.5 wt % to maintain a collective particle size between 220 nm to 260 nm. A solution of potassium persulfate (1 g) in water (50 ml) was added dropwise to a reactor containing 90° C. preheated water (650 ml). The drop rate was adjusted to fully release the persulfate over a period of 24 minutes. Three minutes into the persulfate addition, the emulsion was dropwise added to the reactor over a period of 20 minutes. The reaction was maintained at 90° C. for 1.5 hour, and then cooled to room temperature. The nine respective latex polymers obtained were neutralized with potassium hydroxide solution to bring the pH of each latex solution to about 8.5. Each of the nine latex copolymers prepared were then filtered with a 200 mesh filter to particle sizes from about 220 to 260 nm.

Example 2

Performance of Latexes

The bulk or surface dielectric constant, bulk density, and glass transition temperature of latex copolymeric particulates of Example 1 can be predicted, provided certain information is known about the monomers used in the latex particulate. Specifically, by using the relationships described in Formulas 1-3 provided above, and the homopolymer values shown in Table 1, the nine latexes prepared in Example 1 were calculated to have the respective bulk or surface dielectric constants and bulk densities shown in Table 3 below. All of the latex copolymers prepared had a glass transition temperature that would be acceptable for use at room temperature. Table 3 below shows the results of tests conducted with respect to dispersion stability, freqcel, and printability, as follows:

TABLE 3

Bulk density and surface dielectric constant compared to dispersion stability, freqcel, and printability

| Copolymer | Bulk Density (g/cm³) | Surface Dielectric Constant | Dispersion Stability | Freqcel | Printability |
|---|---|---|---|---|---|
| 1 | 1.16 | 3.12 | Poor | poor | poor |
| 2 | 1.13 | 3.09 | Poor | poor | poor |
| 3 | 1.12 | 3.07 | Poor | poor | poor |
| 4 | 1.11 | 3.06 | Poor | poor | poor |
| 5 | 1.04 | 2.86 | acceptable | acceptable | acceptable |
| 6 | 1.04 | 2.81 | acceptable | acceptable | acceptable |
| 7 | 1.04 | 2.80 | acceptable | acceptable | acceptable |
| 8 | 1.04 | 2.77 | acceptable | acceptable | acceptable |
| 9 | 1.03 | 2.72 | acceptable | acceptable | acceptable |

With respect to dispersion stability shown in Table 3 above, a portion of the latexes prepared in accordance with Example 1 were each diluted to 0.25 wt % solids in water, each dilution filling a standard test tube. The test tubes were placed vertical at rest in a standard test tube rack and monitored for particle layering and settling over an eight-month period. All latexes having a computed density of over 1.10 g/cm³ showed particle precipitation within three weeks, the severity of layering was proportional to density. The latexes having densities less than 1.05 g/cm³ showed no layering or setting over the eight-month period.

With respect to the freqcel and printabilty (decel and decap) observations provided in Table 3, each of the latexes prepared in accordance with Example 1 were incorporated into a standardized ink formulation and print tested for freqcel, decel, and decap using a Hewlett-Packard thermal ink-jet pen. Latexes having computed dielectric constant above 3.0 failed to print above 8 kHz drop frequency and showed poor printability as measured by decel and decap metrics. The severity of freqcel, decel, and decap problems increased proportionately as the latex dielectric constant was increased. The latex having the highest dielectric constant (3.12) failed to print at 3 kHz. Latexes having dielectric constant below 3.0 showed significant improvement in freqcel, decel and decap, with improvement appearing to be inversely proportional to latex dielectric constant. Those latexes having dielectric constant below 2.8 had an even better freqcel, decel and decap performance.

Example 3

Preparation of a Core-shell Latex Particle

A core-shell latex was synthesized using a seeded polymerization process. The core, in this case, was a copolymer of 63 wt % methyl methacrylate and 37 wt % hexyl acrylate, having a computed dielectric constant of 3.01. The shell was a copolymer of 53 wt % hexyl methacrylate, 6 wt % methyl methacrylate, and 1 wt % diethylene glycol dimethacrylate, having a computed dielectric constant of 2.80. The shell was polymerized to encapsulate the core. The core to shell weight ratio was about 40:60. The resultant latex was then tested identically in accordance with Example 3. The freqcel, decel and decap results compared favorably to those latexes of roughly uniform copolymeric material having a bulk dielectric constant of 2.80 described in Example 2.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An ink-jet ink, comprising effective amounts of:
    a) an aqueous ink vehicle;
    b) a colorant admixed in the ink vehicle;
    c) latex particulates dispersed in the ink vehicle, said latex particulates having a bulk density from 0.90 g/cm$^3$ to 1.10 g/cm$^3$ and a surface dielectric constant from 2.0 to 3.0 at room temperature; and
    d) surfactant adsorbed on the surface of the latex particulates.

2. An ink-jet ink as in claim 1, wherein the surface dielectric constant of the latex particulates is from 2.3 to 2.8 at room temperature.

3. An ink-jet ink as in claim 1, wherein the bulk density is from 1.02 g/cm$^3$ to 1.05 g/cm$^3$.

4. An ink-jet ink as in claim 1, wherein the ink vehicle predominantly comprises water.

5. An ink-jet ink as in claim 1, wherein the latex particulates are core-shell latex particulates.

6. An ink-jet ink as in claim 1, wherein the latex particulates are of a single copolymeric material.

7. An ink-jet ink as in claim 1, wherein the surfactant includes a hydrophobic hydrocarbon chain moiety and a hydrophilic ethylene glycol chain moiety.

8. An ink-jet ink as in claim 1, wherein the latex particulates comprise randomly assembled copolymers.

9. An ink-jet ink as in claim 8, wherein the randomly assembled copolymers include from 0.5 wt % to 20 wt % of an acidic monomer.

10. An ink-jet ink as in claim 9, wherein the acidic monomer is selected from the group consisting of acrylic acid, methacrylic acid, vinyl benzoic acid, and methacryloyloxyethylsuccinate.

11. An ink-jet ink as in claim 9, wherein the acidic monomer present at the surface of the latex particulates is neutralized after polymerization.

12. An ink-jet ink as in claim 1, wherein the latex particulates are crosslinked by a crosslinking agent at from 0.5 wt % to 5 wt %.

13. An ink-jet ink as in claim 1, wherein the latex particulates have a glass transition temperature from 0° C. to 50° C.

14. An ink-jet ink as in claim 1, wherein the latex particulates are copolymers and include at least one ring-containing monomer.

15. An ink-jet ink as in claim 1, wherein the colorant is a pigment.

16. An ink-jet ink as in claim 1, wherein the colorant is a dye.

17. A copolymeric latex particulate having a bulk density from 0.90 g/cm$^3$ to 1.10 g/cm$^3$ and a surface dielectric constant from 2.0 to 3.0 at room temperature and having a surfactant adsorbed on the surface of the latex particulate.

18. A latex particulate as in claim 17, wherein the bulk density is from 1.02 g/cm$^3$ to 1.05 g/cm$^3$.

19. A latex particulate as in claim 17, wherein the surface dielectric constant is from 2.3 to 2.8 at room temperature.

20. A latex particulate as in claim 17, wherein the latex particulate is configured for inclusion in an ink-jet ink.

21. A latex particulate as in claim 17, wherein the latex particulate is crosslinked by a crosslinking agent at from 0.5 wt % to 5 wt %.

22. A latex particulate as in claim 17, wherein the latex particulate has a glass transition temperature of from 0° C. to 50° C.

23. A latex particulate as in claim 17, comprising at least two monomers being randomly copolymerized, one of said at least two monomers being a charge forming monomer present at from 0.5 wt % to 20 wt % of total latex particulate weight.

24. An ink-jet ink, comprising effective amounts of:
    a) an aqueous ink vehicle;
    b) a colorant admixed in the ink vehicle; and
    c) copolymeric latex particulates dispersed in the ink vehicle, said latex particulates having a bulk density from 0.90 g/cm$^3$ to 1.10 g/cm$^3$, a surface dielectric constant from 2.0 to 3.0 at room temperature, and a surfactant adsorbed on the surface of the latex particulates.

25. An ink-jet ink as in claim 24, wherein the surface dielectric constant is from 2.3 to 2.8 at room temperature.

26. An ink-jet ink as in claim 24, wherein the latex particulates have a bulk density from 1.02 g/cm$^3$ to 1.05 g/cm$^3$.

27. An ink-jet ink as in claim 24, wherein the latex particulates are crosslinked by a crosslinking agent at from 0.5 wt % to 5 wt %.

28. An ink-jet ink, comprising effective amounts of:
    a) an aqueous ink vehicle having a predetermined liquid density;
    b) a colorant admixed in the ink vehicle; and
    c) copolymeric latex particulates dispersed in the ink vehicle that are separate from the colorant, said latex particulates having a bulk density from the same as the liquid density to 0.1 g/cm$^3$ greater than the liquid density and having a surfactant adsorbed on the surface of the latex particulates.

29. An ink-jet ink as in claim 28, wherein the bulk density is from 0.90 g/cm$^3$ to 1.10 g/cm$^3$.

30. An ink-jet ink as in claim 29, wherein the bulk density is from 1.02 g/cm$^3$ to 1.05 g/cm$^3$.

31. An ink-jet ink as in claim 28, wherein the latex particulates have a surface dielectric constant from 2.0 to 3.0 at room temperature.

32. An ink-jet ink as in claim 31, wherein the latex particulates have a surface dielectric constant from 2.3 to 2.8 at room temperature.

33. An ink-jet ink as in claim 28, wherein the latex particulates are crosslinked by a crosslinking agent at from 0.5 wt % to 5 wt %.

34. An ink-jet ink as in claim 28, wherein latex particulates have a glass transition temperature from 0° C. to 50° C.

35. A copolymeric latex particulate having a bulk density from 0.90 g/cm$^3$ to 1.10 g/cm$^3$ and a surface dielectric constant from 2.0 to 3.0 at room temperature and being crosslinked by a crosslinking agent at from 0.5 wt % to 5 wt %.

36. A latex particulate as in claim 35, wherein the bulk density is from 1.02 g/cm$^3$ to 1.05 g/cm$^3$.

37. A latex particulate as in claim 35, wherein the surface dielectric constant is from 2.3 to 2.8 at room temperature.

38. A latex particulate as in claim 35, further comprising a surfactant adsorbed on the surface of the latex particulate.

39. A latex particulate as in claim 38, wherein the latex particulate is configured for inclusion in an ink-jet ink.

40. A latex particulate as in claim 35, wherein the latex particulate has a glass transition temperature of from 0° C. to 50° C.

41. A latex particulate as in claim 35, comprising at least two monomers being randomly copolymerized, one of said at least two monomers being a charge forming monomer present at from 0.5 wt % to 20 wt % of total latex particulate weight.

42. An ink-jet ink, comprising effective amounts of:
a) an aqueous ink vehicle;
b) a colorant admixed in the ink vehicle; and
c) copolymeric latex particulates dispersed in the ink vehicle, said latex particulates having a bulk density from 0.90 g/cm$^3$ to 1.10 g/cm$^3$, a surface dielectric constant from 2.0 to 3.0 at room temperature; wherein said copolymeric latex particulates are crosslinked by a crosslinking agent at from 0.5 wt % to 5 wt %.

43. An ink-jet ink as in claim 42, wherein the surface dielectric constant is from 2.3 to 2.8 at room temperature.

44. An ink-jet ink as in claim 42, wherein the latex particulates have a bulk density from 1.02 g/cm$^3$ to 1.05 g/cm$^3$.

45. An ink-jet ink as in claim 42, further comprising a surfactant adsorbed on the surface of the latex particulates.

46. An ink-jet ink as in claim 42, wherein the latex particles have a glass transition temperature from 0° C. to 50° C.

47. An ink-jet ink as in claim 24, wherein the latex particles have a glass transition temperature from 0° C. to 50° C.

* * * * *

UNITED STATES PATENT AND TRADEMARK OFFICE
CERTIFICATE OF CORRECTION

PATENT NO. : 7,402,617 B2
APPLICATION NO. : 10/360473
DATED : July 22, 2008
INVENTOR(S) : Sivapackia Ganapathiappan et al.

It is certified that error appears in the above-identified patent and that said Letters Patent is hereby corrected as shown below:

In column 2, line 42, delete "dearly" and insert -- clearly --, therefor.

In column 7, line 44, delete "setting" and insert -- settling --, therefor.

In column 8, line 10, delete "setting" and insert -- settling --, therefor.

In column 8, line 15, delete "setting" and insert -- settling --, therefor.

In column 8, line 18, delete "setting" and insert -- settling --, therefor.

In column 12, line 53, delete "setting" and insert -- settling --, therefor.

Signed and Sealed this

Twenty-second Day of June, 2010

David J. Kappos
*Director of the United States Patent and Trademark Office*